80
1
J. O. Leach.
BEST AVAILABLE COPY
Bag Weaving.
No. 147.
A. I. Patented Jul. 8, 1856.
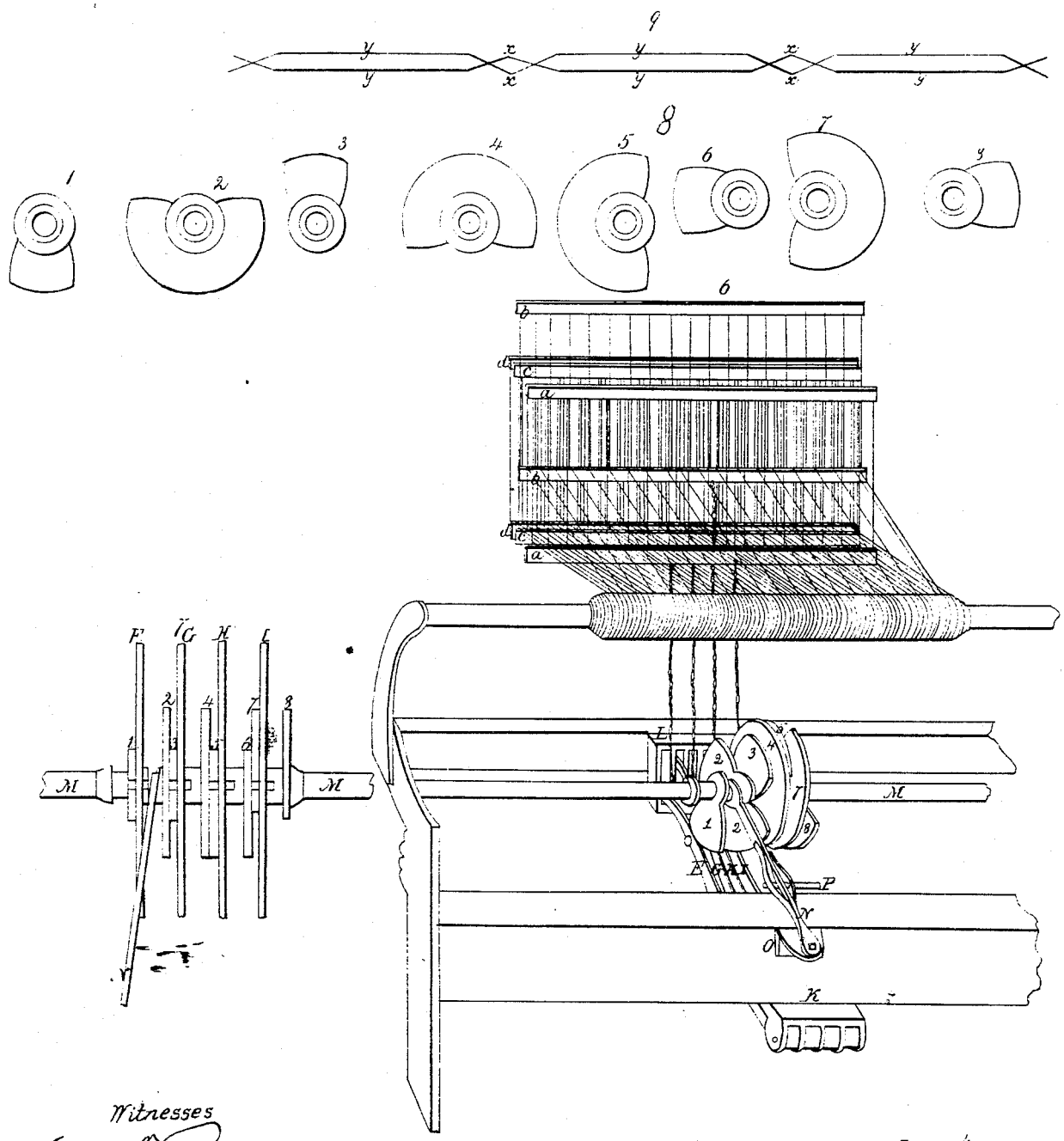
Witnesses
N. Paul Rodgers
N. Miller
Inventor
J. O. Leach
Letters Patent No. 13,724. Improvement in Looms.
of two sets of
ed in refer
ing move BEST AVAILABLE COPY
J. O. Leach.
Bag Weaving.
No. 147. A. I. Patented Jul. 8, 1856.
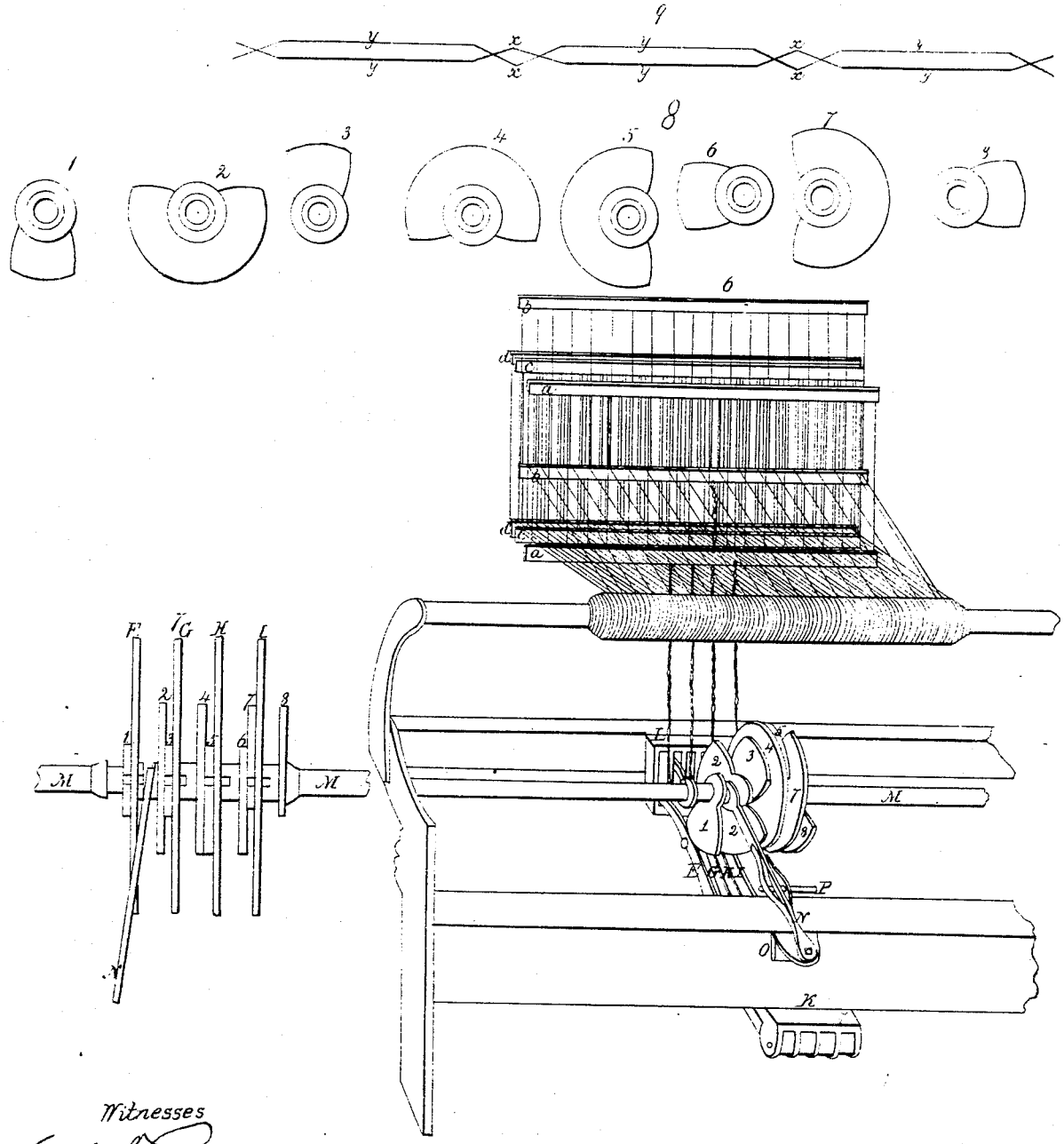
Witnesses
Inventor
H. STERG, PHOTO-LITHOGRAPHER, WASHINGTON, D. C.